United States Patent [19]

Aravamudan et al.

[11] Patent Number: 6,006,272

[45] Date of Patent: Dec. 21, 1999

[54] METHOD FOR NETWORK ADDRESS TRANSLATION

[75] Inventors: Murali Aravamudan; Hong-Yi Tzeng, both of Monmouth, N.J.

[73] Assignee: Lucent Technologies Inc., Murray Hill, N.J.

[21] Appl. No.: 09/027,708

[22] Filed: Feb. 23, 1998

[51] Int. Cl.[6] .................................................. H04L 12/66
[52] U.S. Cl. ......................... 709/245; 709/220; 709/227; 709/228; 709/238
[58] Field of Search .................................. 709/220, 227, 709/228, 238, 245

[56] References Cited

U.S. PATENT DOCUMENTS

| | | | |
|---|---|---|---|
| 5,426,637 | 6/1995 | Derby et al. | 370/401 |
| 5,623,601 | 4/1997 | Vu | 713/201 |
| 5,636,216 | 6/1997 | Fox et al. | 370/402 |
| 5,751,971 | 5/1998 | Dobbins et al. | 709/238 |
| 5,757,924 | 5/1998 | Friedman et al. | 380/49 |
| 5,781,550 | 7/1998 | Templin et al. | 370/401 |
| 5,793,763 | 8/1998 | Mayes et al. | 370/389 |
| 5,802,047 | 9/1998 | Kinoshita | 370/359 |
| 5,802,053 | 9/1998 | Bollella et al. | 370/401 |
| 5,802,285 | 9/1998 | Hirviniemi | 709/250 |
| 5,835,710 | 11/1998 | Nagami et al. | 709/250 |
| 5,856,974 | 1/1999 | Gervais et al. | 370/392 |
| 5,862,344 | 1/1999 | Hart | 709/238 |

OTHER PUBLICATIONS

Kjeld Borch Egevang of Cray Communications and Paul Francis of NTT, "The IP Network Address Translator (NAT)," in Network Working Group, RFC 1631, (May 1994).

J. Postel, J. Reynolds, "File Transfer Protocol (FTP)," in Network Working Group, RFC 959, (Oct. 1985).

ITU Telecommunication Standarization Sector–Study Group 16, "Draft Recommendation H.323V2: Packet Based Multimedia Communications Systems," in International Telecommunication Union H.323V2 (Mar. 27, 1997).

*Primary Examiner*—Zarni Maung
*Assistant Examiner*—Saleh Najjar

[57] ABSTRACT

A method for translating non internet unique addresses of a home network device to an internet unique address for internet communication through a router. Every device within a given home network is assigned three addresses:(i) a configured address identical to the network address of the router enabling access to an Internet; (ii) a logical address visible only to the other devices in the same home network; and (iii) a medium access control ("MAC") address. Every packet originating from a home network source device includes its MAC address, the router MAC address, its configured address and the network destination address, and is forwarded to its destination through the router. The router examines the network destination address to determine whether the communication is intranet or internet. For intranet communications the router replaces the configured address of the home network source device with the logical address of the home network source device, the logical address of the home network destination device with the configured address, its MAC address with the MAC address of the home network destination device, and forwards the packet to the home network destination device. For Internet communications the router forwards the packet along the Internet without replacing any of the source or destination information in the headers of the packet. Based on the source MAC address, however, the router records the logical address of the home network source device as well as the DA, SP, DP and PT in order to identify a response to the packet from the Internet destination device.

7 Claims, 3 Drawing Sheets

METHOD FOR NETWORK ADDRESS TRANSLATION

TECHNICAL FIELD

This invention relates generally to translation of a non internet-unique network address of a network device to an internet-unique network address.

BACKGROUND OF THE INVENTION

Data packets generally comprise the underlying data to be communicated, surrounded by one or more layers of header and footer information to enable forwarding the packet from end user to end user. Initially, a header identifying the application is appended to the data, i.e. the application layer. Thereafter, a header identifying the ports and communication protocol is appended, i.e. the transport layer. The network layer identifies the source and destination devices by their network addresses, such as an IP address. Lastly, the immediate link protocol information is included in the data link layer.

For internet applications the network layer comprises the IP address of the source and destination devices. Proper transmission requires that these addresses be unique. However, their number is limited. For example, there are at most 4 billion IP addresses. With the proliferation of the Internet this number is clearly insufficient. To reduce the demand on IP addresses, devices connected through a gateway, such as a router, to the Internet are not necessarily given Internet unique IP addresses. For example, the devices within a local area network ("LAN") with access to the Internet through a router will have IP addresses which are unique as between devices in the LAN, but not unique as between all devices on the Internet.

To facilitate the following discussion we will refer to a network device with a non unique network address as a home network device. The home network device may be part of an intranet, or it may be a stand-alone computer with access to an internet, such as through an internet service provider. The key is that the home network device does not have a unique network address vis a vis the internet to which it has access.

As for intranet communication, each home network device has a unique IP address. Therefore the home network devices have no difficulty identifying each other and communicating. However, since its network address is not unique with respect to other devices on the Internet its packets cannot be forwarded directly to their respective destinations. Rather, a home network device that wants to forward a packet to a destination device on the Internet initially includes its non-unique address SA in the network layer header and forwards the packet to the router. The router removes the address SA and inserts its own Internet unique address RSA, instead. The router records the source address SA, the destination address DA, the source port SP, the destination port DP and the protocol type PT from the network and transport layers of the packet and then forwards the packet to its destination over the internet.

Any response from the destination will include RSA as its DA' and DA, SP, DP and PT as SA', DP', SP' and PT, respectively. The router will recognize this information as a response from the original destination, now acting as a source, to the original source, now acting as a destination. The router will then replace its IP address RSA from the DA' in the network layer for the non-unique address SA of the original source and forward the response to the appropriate network device.

While the above-mentioned scheme addresses the concern of limited IP addresses, it remains limited in addressing several applications. First, it does not enable a source to send a packet through the Internet to a home network device, unless it is responding to a packet that originated from that home network device. The source simply has no means for identifying the home network device. The source can only identify the router connecting the home network device to the internet. Yet, the router has no means for determining which home network device is the intended recipient of the packet.

A second application where the above-mentioned scheme is at best inefficient, is voice communication over the Internet using a protocol such as ITU H.323, well known in the art. In accordance with the ITU H.323 protocol, the source network device inserts its IP address among the data bits of the IP packet, referred to as the payload as opposed to the network layer header. Clearly, where the source device is a home network device the source address that would be inserted into the payload would be a non-unique address which may not appear outside of the home network. Thus the home network device could not engage in voice communications in accordance with ITU H.323. While it is possible to instruct the router to examine the payload, remove the non-unique network address and insert its own unique network address, this would involve many operations that would overload the router. In addition, the router would have to apply the same operations in reverse when it receives a response from the internet device to the home network device. Moreover, the router would have to be able to handle similar operations for each of a variety of protocols with similar demands, such as the file transfer protocol ("FTP").

A third application where the above-mentioned scheme is limited in enabling access between home network devices and devices on the Internet is the IP security protocol. IP security is a scheme for authenticating the communicating devices. In general, a device employing IP security performs a checksum operation on its IP header and the result is appended as a header to the IP header. The destination device performs a similar checksum operation on the IP header of the received packet and compares the result with the IP security header.

This will not work, however, when the IP packet was forwarded from a home network device to an Internet device in accordance with the above-mentioned scheme. In this scheme the original source address of the packet on which the IP security header depends is replaced with the router source address. Thus when the destination device receives the packet and performs the checksum operation the IP security header will not match. As with voice communications, to employ the router to replace the IP security header is too complicated. Indeed, currently IP security is not used with home network devices.

Accordingly, a method for network address translation not constrained by the aforementioned limitations is desirable and described below.

SUMMARY OF THE INVENTION

In accordance with the present invention every device within a given home network is assigned three addresses:(i) a configured address identical to the network address of the router enabling access to an internet; (ii) a logical address visible only to the other devices in the same home network; and (iii) a medium access control ("MAC") address. To forward a packet, the home network source device includes its MAC address and that of the router in the datalink layer, and its configured address and the network destination address in the network layer, of the packet. The router examines the network destination address to determine whether the communication is intranet or internet. For intranet communications the network destination address is the logical address of the home network destination device. In the network layer, the router replaces the configured address of the home network source device with the logical address of the home network source device and the logical address of the home network destination device with the configured address. In the datalink layer, the router replaces its MAC address with the MAC address of the home network destination device. The router then forwards the packet to the home network destination device.

Where the router determines that the network destination address is an Internet unique address, it forwards the packet along the Internet without replacing any of the source or destination information in the headers of the packet. Based on the source MAC address, however, the router records the logical address of the home network source device as well as the DA, SP, DP and PT in order to identify a response to the packet from the Internet destination device.

BRIEF DESCRIPTION OF THE DRAWINGS

FIG. 3 is an illustrative default profile of a router for directing certain packets to specific predetermined home network devices.

DETAILED DESCRIPTION OF THE INVENTION

In accordance with the method of the present invention every home network device shares an identical configured address G which is identical to the network address of the router R enabling access to the Internet to each of the home network devices. Each home network device also has a logical address visible only to the other devices in the same home network. Lastly, each home network device includes a medium access control ("MAC") address.

Figure 1:
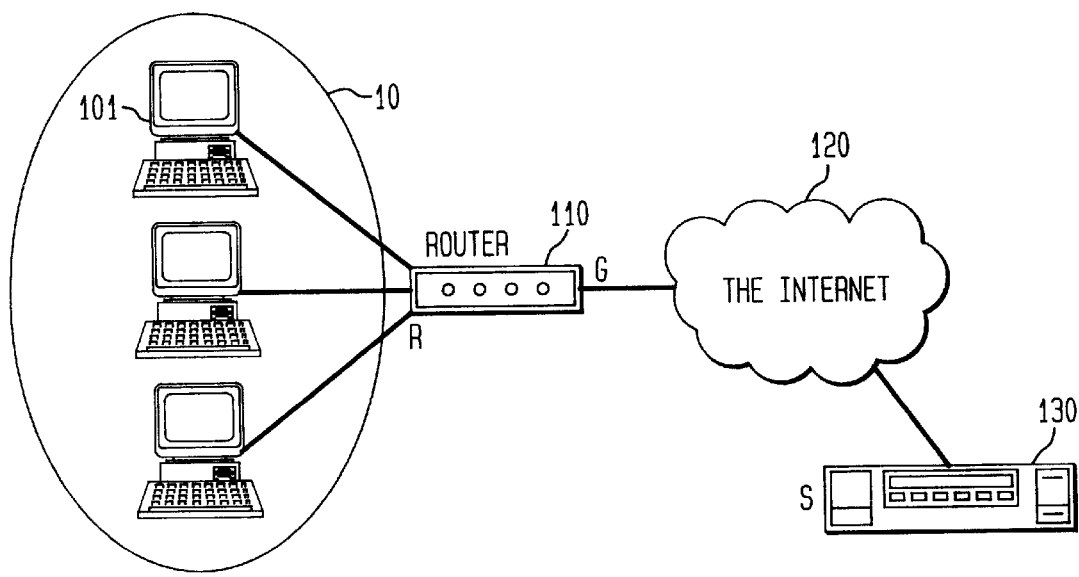
FIG. 1 is a prior art topology drawing of a plurality of home network devices connected to the Internet through a router.
Figure 2:
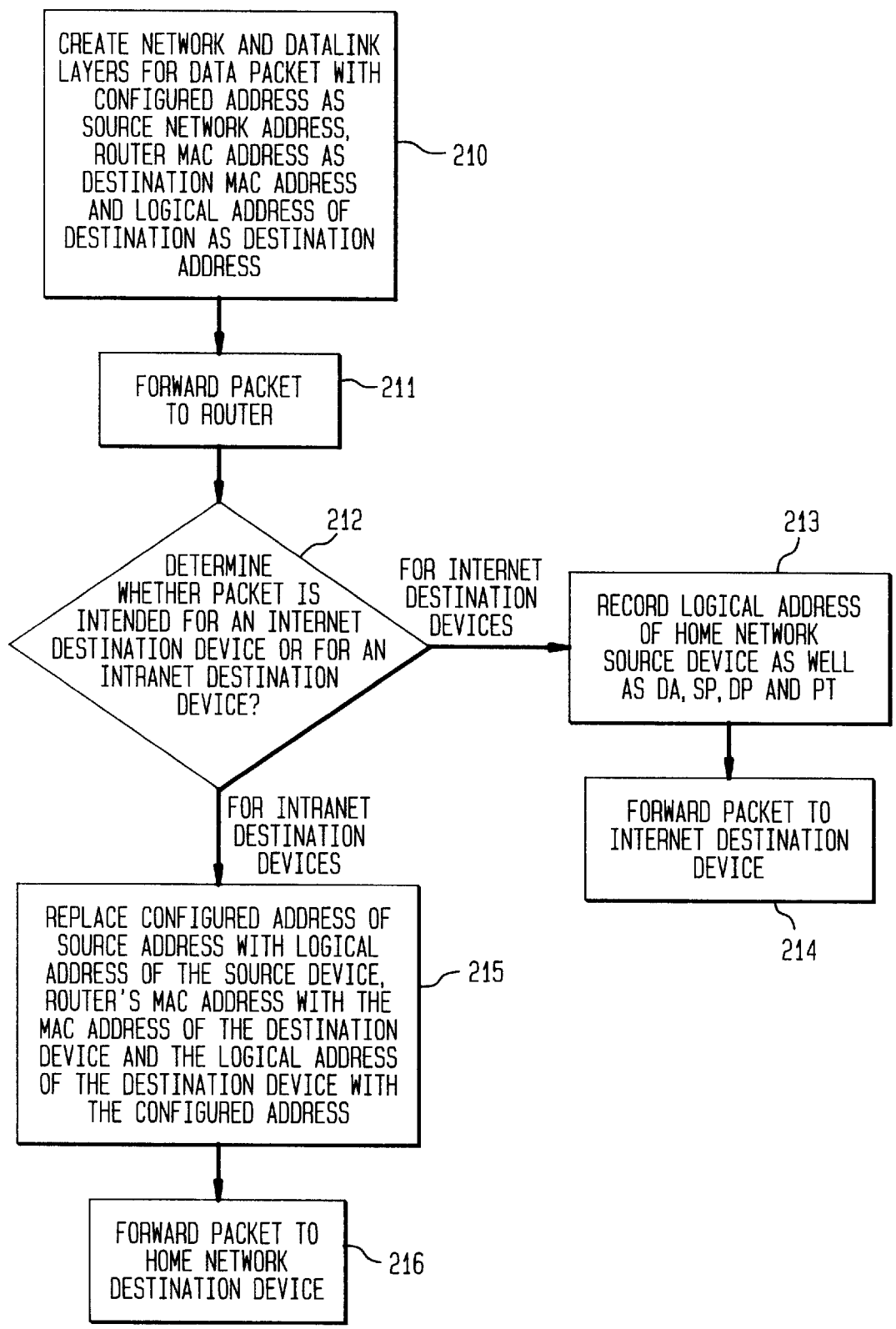
FIG. 2 is a descriptive flowchart of the process of network address translation of a packet originating from a home network, in accordance with the present invention.

Referring to FIG. 2, in a data communications system in accordance with the present invention packets originating from the home network, include the MAC address of the home network source device and that of the router in the datalink layer, and the configured address and the network destination address in the network layer (step 210). In accordance with the present invention every packet originating from the home network, whether to another device on the home network, or to an Internet destination, passes through router R as shown in step 211. As shown in step 212, router R examines the network destination address to determine whether the communication is intranet or Internet. For intranet communications the network destination address is the logical address of the home network destination device. As shown in step 215, the router replaces in the network layer the configured address of the home network source device with the logical address of the home network source device and the logical address of the home network desti-nation device with the configured address. In the datalink layer, the router replaces its MAC address with the MAC address of the home network destination device. The router then forwards the packet to the home network destination device, as shown in step 216.

By initially including the configured address as the network source address the network layer leaves the source ready for forwarding both along the Internet and within the home network. The packet is ready for Internet transmission since the configured address is the router address, the only Internet unique address for the home network devices. Since the configured network source address is internet unique, it can be included in the payload in accordance with H.323 and IP security can be applied as well.

Where router R determines that the network destination address is an Internet unique address, it forwards the packet along the Internet without replacing any of the source or destination information in the headers of the packet, as shown in step 214. Based on the source MAC address, however, the router records the logical address of the home network source device as well as the DA, SP, DP and PT in order to identify a response to the packet from the Internet destination device, as shown in step 213.

The packet is also ready for intranet communications since the logical address of the home network destination device is included in the network layer and it is relatively simple for router R to replace the configured address with the home network source device's logical address. While the present invention adds some complexity to a router for intranet communications, the benefits realized for Internet communications make it worthwhile, especially in systems with relatively heavy Internet traffic.

Figure 4:
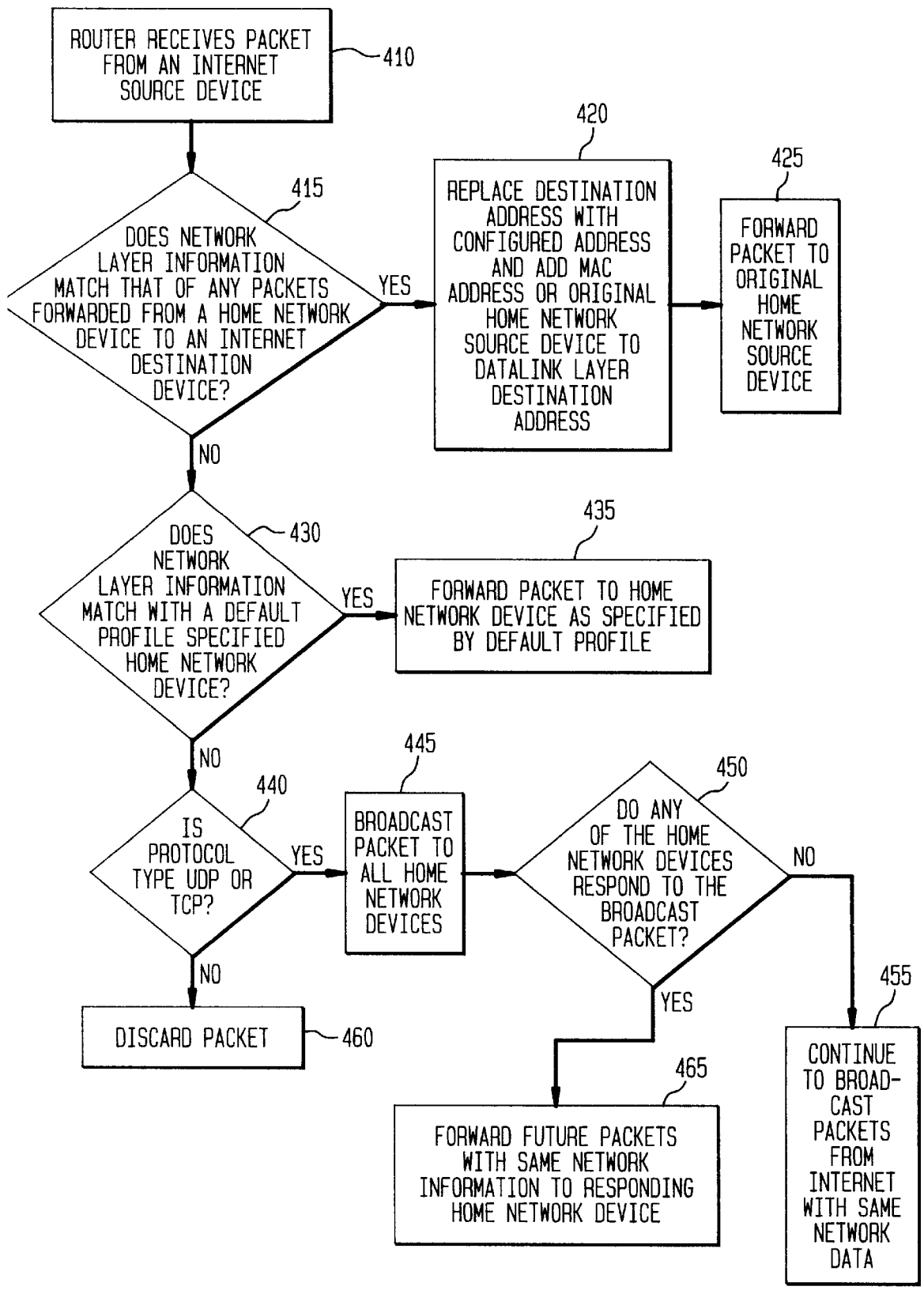
FIG. 4 is a descriptive flowchart of the process of network address translation of a packet originating from an Internet source, in accordance with the present invention.

When receiving a response from a home network device the router handles the packet much the same way as if the responding device is a home network source device as explained above. However, the task is more complicated when the packet originates from the Internet and is destined to a home network device. Referring to FIG. 4, upon receiving a packet from the Internet, as shown in step 410, router R first determines whether the network layer information matches any of the network layer information from a packet that had been forwarded from a home network device, as shown in step 415. In other words the router first determines whether the packet is a response to another packet that had originated from the home network.

The network layer information that the router looks to identify includes for example the network address. In other words, does the network destination address of any packets sent from the home network to the Internet match the network source address of the Internet originating packet. Other network layer information includes datalink port and protocol type as explained above.

If the network layer information enables router R to identify the packet as a response, router R will replace the network destination address in the network layer of the packet with the configured address and add the MAC address of the intended home network destination device in the datalink layer, as shown in step 420. Thereafter router R will forward the packet to the appropriate home network destination device.

If, however, router R cannot identify the home network destination device from the network layer information, the router will then refer to a default profile to match the packet with an appropriate home network device, if applicable, as show in steps 430 and 435. An illustrative default profile is shown in FIG. 3. If no default profile is specified router R then determines whether the protocol type of the packet is User Datagram Protocol ("UDP") or Transmission Control Protocol ("TCP") (step 440). If either one of these protocols are specified then router R will broadcast the packet to all the home network devices as shown in step 445. This is accomplished by adding the broadcast MAC address at the datalink layer. If router R determines in step 450 that less than all home network devices respond to the broadcast packet, it will forward future packets with the same network layer information only to those responding home network devices, as shown in step 465. Otherwise, future packets with the same network layer information will continue to be broadcast, as shown in step 455. Note, that if the router R cannot identify the home network destination device, and the protocol type is not either TCP or UDP, the router may not be able to forward the packet as shown in step 460.

One skilled in the art will understand that if the Internet originating packet has a multicast network address then the router will simply add the multicast MAC address and forward the packet on the home network.

One last note is that the address resolution protocol ("ARP") used to translate logical addresses to MAC addresses must be modified in a home network operating in accordance with the present invention. Typically, a home network device sends an ARP request to learn the MAC address of an intended destination device. The request will include the destination device's logical address and the requesting machine will wait for a response from the destination device with the destination device's MAC address. These requests will however be lost in a network operating in accordance with the present invention since the devices do not recognize their own logical addresses. Thus ARP must be modified such that the ARP requests are sent to the router. Since the router recognizes each device's logical and MAC addresses, it can respond to the request with the MAC address of the intended destination home network device. Alternatively, the router can respond to the ARP request by forwarding its own MAC address and then upon receipt of the packet, replace its MAC address with that of the intended destination home network device and forward the packet accordingly.

Likewise, the router should be designed to intercept all gratuitous ARP transmissions. Otherwise, the device transmitting its own MAC address will announce itself with the configured logical address and confuse all the devices on the home network which identify themselves by the configured address as well.

Lastly, the router can use known techniques for identifying the MAC addresses of the home network devices. These techniques include a Dynamic Host Configuration Protocol ("DHCP") request from a device, a gratuitous ARP transmission from a device and an ARP request from a device.

The foregoing merely illustrates the principles of the present invention. Those skilled in the art will be able to devise various modifications, which although not explicitly described or shown herein, embody the principles of the invention and are thus within its spirit and scope.

What is claimed is:

1. In a data communications system comprising an internet and at least one home network, each of said home networks comprising a plurality of home network devices and having access to said internet through a router with an internet-unique network address, said system employing a method for network address translation of a packet having at least a network layer and a datalink layer, originating from one of said home network devices, said method comprising the following steps:

including in the network layer of said packet a configured logical address to represent the network layer source address of the source home network device, and a logical destination address, said configured logical address being common to each home network device with a common home network, and its router, including in the datalink layer of said packet the MAC address of said router as the datalink layer destination address of the packet;

forwarding said packet from said source home network device to said router, determining whether said packet is intended for a home network device;

if said packet is intended for a home network device, replacing said configured logical address at the network layer of said packet with the logical address of said source home network device, replacing said logical address of the destination home network device with said configured logical address, and replacing said router MAC address with the MAC address of the destination home network device;

if said packet is intended for an internet destination device, recording packet identifying information; and forwarding said packet to its intended destination device.

2. In a system according to claim 1 wherein said packet identifying information includes the logical address of said source home network device, the network layer destination address, the datalink source and destination addresses and the protocol type specified in the packet.

3. In a system according to claim 1 further employing a method for MAC address resolution comprising the following steps:

forwarding all requests for address resolution of a second home network device from a requesting first home network device to said router; and said router responding to said request for address resolution by forwarding to said first home network device the MAC address of said second home network device.

4. In a system according to claim 3 wherein said router is designed to intercept all gratuitous requests for address resolution originating from said home network.

5. In a system according to claim 1 further employing a method for MAC address resolution comprising the following steps:

forwarding all requests for address resolution of a second home network device from a requesting first home network device to said router; and said router responding to said request for address resolution by forwarding to said first home network device the MAC address of said router.

6. In a system according to claim 5 wherein said router is designed to intercept all gratuitous requests for address resolution originating from said home network.

7. In a data communications system comprising an internet and at least one home network, each of said home networks comprising a plurality of home network devices and having access to said internet through a router with an internet-unique network address, said system employing a method for network address translation of a packet having at least a network layer and a datalink layer, originating from a source device on said internet, received at said router and intended for one of said home network devices, said method comprising the following steps:

determining whether the network layer of a first packet from said source device includes information that matches that of any packet previously transmitted from a home network device to said source device on said internet;

if said network layer of said first packet includes information that matches that of any packet having previously been transmitted from a home network device to said source device on said internet, then replacing the network layer destination address of said first packet with a configured logical address, said configured logical address being common to each home network device with a common home network, and its router and adding at said datalink layer the MAC address of said home network device as the datalink destination address;

if network layer information of said first packet matches an entry in a default service profile, then forwarding said first packet in accordance with said default service profile;

if said first packet includes a TCP or UDP protocol type, then broadcasting said first packet to all of said plurality of home network devices;

if any of said home network devices respond to said broadcast first packet, then forward subsequent packets with the same network layer information as said first packet, only to said responding home network devices; and discarding all packets not forwardable by the foregoing steps.

* * * * *